United States Patent
Dubey et al.

(10) Patent No.: US 12,522,550 B2
(45) Date of Patent: Jan. 13, 2026

(54) METHOD FOR PREPARING A SOLID FORM OF BISPHENOL F

(71) Applicant: Aditya Birla Chemicals (Thailand) Ltd. (Advanced Materials), Bankgkok (TH)

(72) Inventors: Pradip Kumar Dubey, Mumbai (IN); Chandan Kumar Singh, Rayong (TH); Parawee Thanomsup, Rayong (TH)

(73) Assignee: Aditya Birla Chemicals (Thailand) Ltd. (Advanced Materials), Bangkok (TH)

( * ) Notice: Subject to any disclaimer, the term of this patent is extended or adjusted under 35 U.S.C. 154(b) by 753 days.

(21) Appl. No.: 17/905,275

(22) PCT Filed: Mar. 5, 2021

(86) PCT No.: PCT/IB2021/051842
§ 371 (c)(1),
(2) Date: Aug. 30, 2022

(87) PCT Pub. No.: WO2021/176407
PCT Pub. Date: Sep. 10, 2021

(65) Prior Publication Data
US 2023/0110767 A1    Apr. 13, 2023

(30) Foreign Application Priority Data
Mar. 6, 2020  (IN) .............. 202011009697

(51) Int. Cl.
*C07C 37/70* (2006.01)
*C07C 39/16* (2006.01)

(52) U.S. Cl.
CPC .............. *C07C 37/70* (2013.01); *C07C 39/16* (2013.01)

(58) Field of Classification Search
CPC .................................................. C07C 39/16
See application file for complete search history.

(56) References Cited

FOREIGN PATENT DOCUMENTS

| CN | 101429273 A | 5/2009 | |
|---|---|---|---|
| CN | 102491879 A | 6/2012 | |
| JP | S5612328 A | 2/1981 | |
| JP | 4145367 B2 | 9/2008 | |
| KR | 20130083271 A | * 7/2013 | .............. C08L 61/04 |
| KR | 101360908 B1 | 2/2014 | |
| NL | 8004422 A | 2/1981 | |
| TW | 487624 B | 5/2002 | |
| WO | 1988005345 A1 | 7/1988 | |

OTHER PUBLICATIONS

Machine translation of Patent No. KR101360908B1; Jul. 22, 2013 (Year: 2013).*
Extrusion: The Definitive Processing Guide and Handbook, 2005 (Year: 2005).*
Machine translation of KR20130083271A, Jul. 22, 2013, pp. 1-17 (Year: 2013).*
PCT Office, International Search Report and Written Opinion issued in PCT/IB2021/051842 dated Jun. 21, 2021.
Harold F. Giles et al, The Definitive Processing Guide and Handbook, Extruder Temperature Profiles, Oct. 1, 2005.

* cited by examiner

*Primary Examiner* — Medhanit W Bahta
(74) *Attorney, Agent, or Firm* — Wood Herron & Evans LLP

(57) ABSTRACT

A method for preparing a solid form of Bisphenol F is disclosed. The method comprises feeding Bisphenol F at a temperature in the range of 130-170° C. into an extruder; processing the fed Bisphenol F in a first mixing zone of the extruder, the first mixing zone maintained at a temperature in the range of 110-130° C., and then in a second mixing zone of the extruder, the second mixing zone maintained at a temperature in the range of 100-110° C.; conveying the processed Bisphenol F to a discharge zone of the extruder, the discharge zone maintained at a temperature in the range of 75-100° C.; discharging the processed Bisphenol F; and obtaining Bisphenol F in the solid form.

14 Claims, No Drawings

METHOD FOR PREPARING A SOLID FORM OF BISPHENOL F

FIELD OF INVENTION

The present invention is related to a method for preparing solid forms of Bisphenol F. More specifically, it relates to a dust-free method for preparing solid forms of Bisphenol F in desired shapes and sizes.

BACKGROUND

Bisphenol F is used in a variety of common consumer products, for example, in the coating of drinks and food cans, composites, chemical resistant floor coating, metal coatings, pipe coating, constructions, dental materials, and adhesives. It is commonly used in the manufacturing of plastics, such as polycarbonates, phenolic resins, benzoxazine, and epoxy resins, and is used for increasing the chemical, mechanical and thermal resistance of materials.

A more preferable form of Bisphenol F for safer use of the chemical is in the form of pellets or granules. However, Bisphenol F consists of various isomers such as 2,4'-dihydroxydiphenylmethane, 2,2'-dihydroxydiphenylmethane, 4,4'-dihydroxydiphenylmethane, and a few other oligomers. The different isomer ratios can give different physical, chemical, and performance properties, and hence the melting point of Bisphenol F can be varied. This poses challenges in the processing of Bisphenol F through palletization and flaking. Due to its large melting point range, processing Bisphenol F through the conventional process of flaking and spray drying is inconvenient. The extended melting point results in a longer cooling time for the granules formed by spray drying and therefore, taller spray dryers and coolers are used to compensate for the longer cooling times. This makes processing Bisphenol F by spray drying a very uneconomical and time-consuming process, which is difficult to scale-up.

In order to use Bisphenol F to produce epoxy resins, the compound is usually first dissolved in organic solvents and then the solvents are removed through a drying process. This increases the processing time of Bisphenol F and also poses a serious health risk due to the use of the solvents in the process.

KR101360908B1 discloses a method of manufacturing Bisphenol F into pellets by using a solvent for kneading the slurry. The process disclosed is not economically preferable because of the use of organic solvents and their recovery. In addition, using organic solvents poses a health risk to the environment.

WO1988005345A1 discloses a method of making Bisphenol granules using a drum flaker. The process disclosed has the disadvantage of excess dust production during the manufacturing process, therefore posing a health risk. Said process also requires an additional screening step to obtain the product in the required sizes making the process time-consuming.

JPS5612328A discloses a process for preparing dihydroxydiphenylmethane by solidifying and crushing pasty or molten dihydroxydiphenylmethane with a kneader. The compound is solidified and crushed in the extruder and extruded as pellets. The process described is time-consuming and inefficient as it requires slow-cooling of the compound in the extruder itself.

JP04145367B2 describes a process for the continuous granulation of Bisphenol F. The process disclosed is time consuming as it requires a four-step process involving kneading, solidifying, granulating, and finally cooling the compound. Further, the process is also expensive as it requires different equipment to carry out one or more steps.

SUMMARY

The present disclosure relates to a method for preparing a solid form of Bisphenol F. The method comprises feeding Bisphenol F at a temperature in the range of 130-170° C. into an extruder; processing the fed Bisphenol F in a first mixing zone of the extruder, the first mixing zone maintained at a temperature in the range of 110-130° C., and then in a second mixing zone of the extruder, the second mixing zone maintained at a temperature in the range of 100-110° C.; conveying the processed Bisphenol F to a discharge zone of the extruder, the discharge zone maintained at a temperature in the range of 75-100° C.; discharging the processed Bisphenol F; and obtaining Bisphenol F in the solid form.

DETAILED DESCRIPTION

Reference will now be made in detail to embodiments of the present disclosure. The terminology used in the description presented herein is not intended to be interpreted in any limited or restrictive manner, simply because it is being utilized in conjunction with a detailed description of certain specific embodiments of the invention. Furthermore, embodiments of the invention may include several features, no single one of which is solely responsible for its desirable attributes or which is essential to practicing the inventions herein described.

It will be understood by those skilled in the art that the foregoing general description and the following detailed description are explanatory of the invention and are not intended to be restrictive thereof.

The terms "a," "an,", and "the" are used to refer to "one or more" (i.e., to at least one) of the grammatical object of the article.

Reference throughout this specification to "an aspect", "another aspect" or similar language means that a particular feature, structure, or characteristic described in connection with the embodiment is included in at least one embodiment of the present invention.

The terms "comprises", "comprising", or any other variations thereof, are intended to cover a non-exclusive inclusion and are not intended to be construed as "consists of only", such that a process or method that comprises a list of steps does not include only those steps but may include other steps not expressly listed or inherent to such process or method.

Likewise, the terms "having" and "including", and their grammatical variants are intended to be non-limiting, such that recitations of said items in a list is not to the exclusion of other items that can be substituted or added to the listed items.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure relates processing of Bisphenol F. Specifically, the present disclosure relates to the processing of Bisphenol F into solid forms of desired shapes and forms. Accordingly, the present disclosure discloses a method for preparing a solid form of Bisphenol F. The method comprises feeding Bisphenol F at a temperature in the range of 130-170° C. into an extruder; processing the fed Bisphenol F in a first mixing zone of the extruder, the first mixing zone maintained at a temperature in the range of 110-130° C. and then in a second mixing zone of the extruder, the second mixing zone maintained a temperature in the range of 100-110° C.; conveying the processed Bisphenol F to a discharge zone of the extruder, the discharge zone maintained at a temperature in the range of 75-100° C.; discharging the processed Bisphenol F; and obtaining Bisphenol F in the solid form.

In accordance with an embodiment, Bisphenol F is fed into the extruder at a temperature in the range of 130-150° C.

In accordance with an embodiment, the first mixing zone is maintained at a temperature in the range of 115-130° C.

In accordance with an embodiment, the second mixing zone is maintained at a temperature in the range of 105-110° C.

In accordance with an embodiment, the discharge zone is maintained at a temperature in the range of 75-95° C.

Any suitable extruder may be used to carry out the disclosed method. The extruder can be a single screw extruder, a twin screw extruder, and a multiple screw extruder. In some embodiments, the extruder is a counter-rotating or a co-rotating twin screw extruder. In a specific embodiment, the extruder is a co-rotating twin screw extruder.

The total residence time of the Bisphenol F in the extruder is in the range of 0.2 to 10 minutes. In specific embodiments, the total residence time is in the range of 0.2 to 5 minutes.

Bisphenol F is known to exist as a mixture of various isomers such as 2,4'-dihydroxydiphenylmethane, 2,2'-dihydroxydiphenylmethane, and 4,4'-dihydroxydiphenylmethane, and a few other oligomers. In various embodiments of the present disclosure, Bisphenol F comprises 35-45 wt % of 2,4'-dihydroxydiphenylmethane, 25-35 wt % of 4,4'-dihydroxydiphenylmethane and 10-20 wt % of 2,2'-dihydroxydiphenylmethane.

The processed Bisphenol F is discharged in a semi-solid or semi-molten state. In various embodiments, the discharged Bisphenol F is in a form of a semi-solid slurry, a paste, or semi-solid noodles.

The solid form of Bisphenol F may be obtained using any suitable method and/or equipment, for example, a cutting die, a compression molding device, an injection molding device or a moving belt with a shaped cavity. In an embodiment, the extruder is fitted with a die and a cutter system to covert the discharged Bisphenol F into pellets. In accordance with an embodiment, the discharged Bisphenol F is cooled with a cooling medium and then converted into the solid form using a cutter or a chopper, or a die. In another embodiment, the discharged Bisphenol F is cooled and chopped simultaneously to obtain the solid form. In accordance with an embodiment, the discharged Bisphenol F is conveyed to an injection molding machine to convert it into the solid form, which is subsequently cooled. In another embodiment, the discharged Bisphenol F is conveyed to a moving belt flaker having molds on the belt to convert it into the solid form, which is subsequently cooled.

The cooling medium can be any suitable cooling medium that does not react chemically with Bisphenol F. Examples of suitable cooling mediums include but are not limited to air, water, and an inert gas, for example, nitrogen. In an embodiment, the cooling medium has a temperature in the range of 0-70° C. In a specific embodiment, the cooling medium has a temperature in the range of 20-55° C. The cooling can be performed by direct or indirect transfer of heat.

The solid form can be of any desired shape and size. Examples of the solid form that may be obtained from the disclosed method include but are not limited to noodles, pellets, granules, flakes, prills, aggregates, particles, and balls.

The disclosed method is completely or substantially dust-free. In accordance with an embodiment, about 98-99.99% of the fed Bisphenol F gets converted to the solid form.

EXAMPLES

Example 1: Preparing Bisphenol F Pellets 300 g of molten Bisphenol F at 140° C. was fed into the hopper of a twin screw extruder. The specification of the extruder used is as follows:

Extruder specification: TW 16 MM series extruder from THMCO Thailand (Phase 3, Voltage: 380 V, Motor: 1.5 KW).

The fed Bisphenol F was processed in a first mixing zone of the extruder, and then in a second mixing zone of the extruder. The processed Bisphenol F was conveyed to a discharge zone of the extruder. The temperature profiles of the first mixing zone, the second mixing zone, and the discharge zone are provided in Table 1 below.

TABLE 1

| Zone | Temperature |
| --- | --- |
| First mixing zone | 120° C. |
| Second mixing zone | 110° C. |
| Discharge zone | 80° C. |

The residence time for this experiment was 1.25 minutes, which was equally divided among the three different zones mentioned above.

Pasty noodles of the processed Bisphenol F were discharged from the extruder. The noodles were cooled by blowing cold air at 30° C. and were cut into long pellets.

Example 2: Preparing Bisphenol F Pellets 250 g of molten Bisphenol F at 150° C. was fed into the hopper of a twin screw extruder. The specification of the extruder used is as follows:

Extruder specification: TW 16 MM series extruder from THMCO Thailand (Phase 3, Voltage: 380 V, Motor: 1.5 KW).

The fed Bisphenol F was processed in a first mixing zone of the extruder, and then in a second mixing zone of the extruder. The processed Bisphenol F was conveyed to a discharge zone of the extruder. The temperature profiles of the first mixing zone, the second mixing zone, and the discharge zone are provided in Table 2 below.

TABLE 2

| Zone | Temperature |
| --- | --- |
| First mixing zone | 115° C. |
| Second mixing zone | 100° C. |
| Discharge zone | 85° C. |

The residence time for this experiment was 4.5 minutes, which was equally divided among the three different zones mentioned above.

Pasty noodles of the processed Bisphenol F were discharged from the extruder. The noodles were cooled by water at 20° C. The cooled noodles were cut into long pellets.

Example 3: Preparing Bisphenol F Balls 250 g of molten Bisphenol F at 135° C. was fed into the hopper of a twin screw extruder. The specification of the extruder used is as follows:

Extruder specification: TW 16 MM series extruder from THMCO Thailand (Phase 3, Voltage: 380 V, Motor: 1.5 KW).

The fed Bisphenol F was processed in a first mixing zone of the extruder, and then in a second mixing zone of the extruder. The processed Bisphenol F was conveyed to a discharge zone of the extruder. The temperature profiles of the first mixing zone, the second mixing zone, and the discharge zone are provided in Table 3 below.

TABLE 3

| Zone | Temperature |
| --- | --- |
| First processing zone | 110° C. |
| Second processing zone | 105° C. |
| Discharge zone | 95° C. |

The residence time for this experiment was 1.5 minutes, which was equally divided among the three different zones.

Pasty noodles coming out from the extruder were fed into the molds of an injection molding device. The molding device was operated with a cycle time of less than 1 minute for molding and de-molding. During this cycle time, the molds were cooled using water at 25° C. At the end of the molding device, the Bisphenol F was de-molded to obtain balls.

Example 4: Preparing Bisphenol F Pellets 1500 g of molten Bisphenol F at 145° C. was fed into the hopper of a twin screw extruder. The specification of the extruder used is as follows:

Extruder specification: TW 16 MM series extruder from THMCO Thailand (Phase 3, Voltage: 380 V, Motor: 1.5 KW).

The fed Bisphenol F was processed in a first mixing zone of the extruder, and then in a second mixing zone of the extruder. The processed Bisphenol F was conveyed to a discharge zone of the extruder. The temperature profiles of the first mixing zone, the second mixing zone, and the discharge zone are provided in Table 4 below.

TABLE 4

| Zone | Temperature |
| --- | --- |
| First processing zone | 120° C. |
| Second processing zone | 105° C. |
| Discharge zone | 90° C. |

The residence time for this experiment was 2 minutes, which was equally divided among the three different zones.

Pasty noodles coming out from the extruder were fed to molds of a moving belt flaker. The molds were filled with a cycle time of less than 1 minute for molding and were cooled while moving along the length of the moving belt flaker. The molds were cooled using water spray on the other side of the belt at 25° C. At the end of the moving belt flaker, the Bisphenol F was de-molded to obtain pellets.

The amount of the fed Bisphenol F which was converted into the solid form i.e., the pellets and balls obtained in Examples 1-4 was calculated. This was done by weighing Bisphenol F fed into the extruder and weighing the pellets, or balls obtained, using conventional lab weight measuring instruments, and calculating the difference in the weight of the fed Bisphenol F and the weight of pellets or the balls. A very less weight loss of up to 0.2% was observed.

INDUSTRIAL APPLICABILITY

The disclosed method is simple and economical. The method does not involve the use of any organic solvents, which makes it environmentally friendly. The cooling medium used in the method can be filtered and recycled. This makes the method more economical and industrially feasible. The method generates negligible or no dust. Therefore, the solid forms of Bisphenol F obtained from the method are completely or substantially dust-free, exhibit lower discoloration, and are easy to pack, transport, and handle. The method converts about 98-99.99% of Bisphenol F into the solid form.

We claim:

1. A method for preparing a solid form of Bisphenol F, the method comprising:
    feeding Bisphenol F at a temperature in the range of 130-170° C. into an extruder;
    processing the fed Bisphenol F in a first mixing zone of the extruder, the first mixing zone maintained at a temperature in the range of 110-130° C., and then in a second mixing zone of the extruder, the second mixing zone maintained at a temperature in the range of 100-110° C.;
    conveying the processed Bisphenol F to a discharge zone of the extruder, the discharge zone maintained at a temperature in the range of 75-100° C.;
    discharging the processed Bisphenol F; and
    obtaining Bisphenol F in the solid form.

2. The method as claimed in claim 1, wherein Bisphenol F is fed into the extruder at a temperature in the range of 130-150° C.

3. The method as claimed in claim 1, wherein the first mixing zone is maintained at a temperature in the range of 115-130° C.

4. The method as claimed in claim 1, wherein the second mixing zone is maintained at a temperature in the range of 105-110° C.

5. The method as claimed in claim 1, wherein the discharge zone is maintained at a temperature in the range of 75-95° C.

6. The method as claimed in claim 1, wherein the extruder is selected from a group consisting of a single screw extruder, a twin screw extruder, and a multiple screw extruder.

7. The method as claimed in claim 6, wherein the extruder is a co-rotating or a counter-rotating twin screw extruder.

8. The method as claimed in claim 1, wherein total residence time of the Bisphenol F in the extruder is in the range of 0.2 to 10 minutes.

9. The method as claimed in claim 1, wherein the total residence time is in the range of 0.2 to 5 minutes.

10. The method as claimed in claim 1, wherein the discharged Bisphenol F is in a semi-solid or semi-molten state.

11. The method as claimed in claim 10, wherein the discharged Bisphenol F is in a form selected from the group consisting of a semi solid slurry, a paste, and semi-solid noodles.

12. The method as claimed in claim 1, wherein the solid form is selected from the group consisting of noodles, pellets, granules, flakes, prills, aggregates, particles, and balls.

13. The method as claimed in claim 12, wherein the solid form is obtained by a cutting die, a compression moldings device, an injection molding device or a moving belt with a shape cavity.

14. The method as claimed in claim 1, wherein 98-99.99% of the fed Bisphenol F is converted to the solid form.

* * * * *